(12) United States Patent
Tan

(10) Patent No.: US 7,940,678 B2
(45) Date of Patent: May 10, 2011

(54) METHOD FOR TRIGGERING FAILURE DETECTION IN BIDIRECTIONAL FORWARDING DETECTION

(75) Inventor: Xuefei Tan, Shenzhen (CN)

(73) Assignee: Huawei Technologies Co., Ltd., Shenzhen, Guangdong Province (CN)

( * ) Notice: Subject to any disclaimer, the term of this patent is extended or adjusted under 35 U.S.C. 154(b) by 517 days.

(21) Appl. No.: 11/990,145

(22) PCT Filed: May 30, 2006

(86) PCT No.: PCT/CN2006/001152
§ 371 (c)(1),
(2), (4) Date: Feb. 7, 2008

(87) PCT Pub. No.: WO2007/016833
PCT Pub. Date: Feb. 15, 2007

(65) Prior Publication Data
US 2010/0149992 A1    Jun. 17, 2010

(30) Foreign Application Priority Data
Aug. 10, 2005 (CN) .......................... 2005 1 0089888

(51) Int. Cl.
*H04L 12/26* (2006.01)
(52) U.S. Cl. .................... 370/242; 370/217
(58) Field of Classification Search .......... 370/220–224, 370/227–229, 241–245, 395.2–395.3; 709/223, 709/220
See application file for complete search history.

(56) References Cited

U.S. PATENT DOCUMENTS

| 6,314,512 | B1 | 11/2001 | Branson et al. | |
|---|---|---|---|---|
| 2003/0105850 | A1* | 6/2003 | Lean et al. | 709/223 |
| 2006/0077891 | A1* | 4/2006 | Smith et al. | 370/220 |
| 2006/0209685 | A1* | 9/2006 | Rahman et al. | 370/229 |

FOREIGN PATENT DOCUMENTS

| CN | 1501644 A | 6/2004 |
|---|---|---|
| CN | 1578234 A | 9/2005 |

OTHER PUBLICATIONS

Daishu; "BFD-High-Speed Route Fault Detection"; China Computer Paper, pp. 1-2, Mar. 28, 2005.
"BFD Finding Out a Forwarding Fault of a Router"; Network World, pp. 1-2, Mar. 21, 2005.
International Search Report from the Chinese Patent Office for International Application No. PCT/CN2006/001152.

(Continued)

*Primary Examiner* — Ricky Ngo
*Assistant Examiner* — Iqbal Zaidi
(74) *Attorney, Agent, or Firm* — Finnegan, Henderson, Farabow, Garrett & Dunner, LLP

(57) ABSTRACT

A method for failure detection on a bidirectional forwarding link mainly includes: sending, by one side of a BFD session, a BFD packet to the opposite side of the BFD session, and detecting a BFD packet sent by the opposite side, and starting, by the local side of the BFD session, BFD session detection when receiving a first BFD packet sent from the opposite side. By the method of the invention, it can be avoided that a router misinforms that failure occurs on a BFD session link due to difference of delays needed to deliver a BFD session parameter from a negotiation module of the router to a detection module.

15 Claims, 3 Drawing Sheets

OTHER PUBLICATIONS

Extended European Search Report for European Application No. 06742040.6 including supplementary European search report and European search opinion (Sep. 18, 2008).
Katz, et al., "Bidirectional Forwarding Detection; draft-ietf-bfd-base-02.txt", IETF Standard-Working Draft, Network Working Group, Internet Draft, pp. 1-43, (Mar. 1, 2005).
Aggarwal, et al., "BFD for MPLS LSPs, draft-raggarwa-mpls-bfd-00.txt", IETF Standard-Working Draft, Network Working Group, Internet Draft, pp. 1-9, (Oct. 1, 2003).
Katz, et al., "BFD for IP v4 and IPv6 (Single Hop), draft-ietf-bfd-v4v6-1hop-02.txt", IETF Standard-Working Draft, Network Working Group, Internet Draft, pp. 1-11, (Mar. 1, 2005).
Oral Proceedings dated Jul. 29, 2010 from the European Patent Office for International Application No. EP06742040.6 (11 pages).
Official Communication dated Sep. 28, 2009 from the European Patent Office for International Application No. EP06742040.6 (6 pages).
R. Aggarwal et al., Draft Memo, "BFD for MPLS LSPA," Jan. 2005 (11 pages).
D. Katz et al., Draft Memo, "BFD for Multihop Paths," Sep. 2005 (6 pages).
Written Opinion of the International Search Authority from the Chinese Patent Office for International Application No. PCT/CN2006/001152 (3 pages).
Chen Yunqing and Hu Lin, "Develop Reliable IP Metropolitan Area Core Network," China Telecom Beijing Research Institute, dated Apr. 28, 2005 (6 pages).
Gu Yu, "OAM and Failure Detection Function Implementation in MPLS Network," Telecom World Jun. 2005 (5 pages).

* cited by examiner

METHOD FOR TRIGGERING FAILURE DETECTION IN BIDIRECTIONAL FORWARDING DETECTION

FIELD OF THE INVENTION

The present invention relates to link detection technologies, and in particular, to a method for triggering failure detection in a Bidirectional Forwarding Detection.

BACKGROUND OF THE INVENTION

With the development of communication technologies, how to guarantee a quality of data transmission and how to rapidly locate a failure when a failure occurs on data transmission has become a problem urgent to be solved. Therefore, BFD, as a fast detection mechanism, emerges as the times require. In BFD, a link is detected by a rapid "Hello" mechanism with a rate that can be negotiated.

BFD may be used for detecting the correctness of various types of transmission, including Ethernet, Multi-Protocol Label Switching (MPLS) Path, common routing encapsulation and IP network security protocol (IPSec) tunnel.

BFD is developed from the basic transmission technology step by step, so with BFD, failure in each layer of a network may be detected. The object of BFD is to provide a failure detection mechanism with a low overhead and a short detection period on a path between adjacent routers. The adjacent routers refer to routers connected via any one or more logic links, and it is not limited to one hop between the routers. BFD may perform detection on an interface, a data link and even extended to a forwarding engine itself.

FIG. 1 is a schematic diagram showing networking of an overall application environment of BFD. In the networking, router A, router B, and router C are all implemented with BFD function. Router A and router C are connected via a link AC, router B and router C are connected via a link BC. BFD may be applied on links AC and BC for detecting failure status of the links.

BFD may be abstracted as a simple service, and service primitives provided include: creating, deleting and modifying a BFD session under the premise of a given destination address and other parameters. In BFD, a signal is provided to an operator to indicate the start or end of a BFD session, or to inform the operator of the BFD session negotiation result or the modification result, etc., and to provide state information of a detected link to the application layer, for example, information UP indicates that the link is in normal state, while DOWN information indicates a link failure.

BFD is similar to "Hello" protocol. After a BFD session is established, the two parties of the BFD session periodically send BFD packets to the opposite party on a link on which BFD is applied, and periodically detect arrival status of packets from the opposite party on the link. If a party does not receive a BFD packet from the opposite side within a time interval, it is regarded that a failure occurs on the link, so as to rapidly find a link failure.

In the networking shown in FIG. 1, it is assumed that router A and router C are mutual neighbors in a BFD session, and no BFD session is established on the link AC initially. The lifecycle of a BFD session mainly has the following stages:

1) Initial Establishment of a BFD Session.

Firstly, a BFD instance is created on router A and router C respectively. Then, router A and router C obtain IP addresses of their neighbors. BFD has no automatic neighbor finding mechanism, so a BFD instance may obtain the IP address of a neighbor via static configuration or depending on other application protocols.

After obtaining the IP address of a neighbor, the BFD instance obtains a discriminator assigned by the opposite party and assigns a discriminator locally. The discriminator may be configured manually, or obtained via automatic in-band negotiation or out-band negotiation. In other words, negotiation of the discriminator is performed via another application protocol and then notified to the BFD instance. If the automatic in-band negotiation mode is employed, the timing sequence of the BFD session is established between routers via three handshakes, the specific negotiation of which is irrelative to the invention, and reference may be made to related BFD protocol documents.

2) Parameter Negotiation of a BFD Session.

After a BFD session is established between BFD instances of the neighbors via three handshakes, BFD session parameters need to be negotiated to conform the BFD packet transceiving speed, failure determination time and session mode (such as asynchronous mode or synchronous mode) of the two parties.

Before starting the BFD session parameter negotiation, each router estimates its capability of sending and receiving BFD packets based on preset conditions, such as influence on bandwidth and CPU occupancy. Then it negotiates the shortest time to detect a failure, i.e. failure determination time, with a neighboring router. The failure determination time negotiated may be modified in real time.

Once various BFD session parameters are negotiated and the BFD session is established, the BFD session is triggered into a failure detection stage.

3) BFD Failure Detection.

In the invention, BFD failure detection stage is illustrated in the case that BFD session mode is asynchronous mode. After the BFD session is established and related parameters are negotiated, the parties of the BFD session periodically send a BFD control packet to the opposite side according to asynchronous mode in a time interval that is negotiated. The BFD control packet is adapted to perform heartbeat detection. The function and operation mode of the BFD control packet is the same as that of a HELLO packet of other routing protocols but the sending frequency is usually higher.

When one party of the BFD session sends the BFD control packet to the opposite side, it periodically detects the BFD packet sent by the opposite side. If it detects that a preset number of BFD packets from the neighbor are lost consecutively, it declares that failure occurs on the link and informs other applications, such as routing modules, of a link failure message. The number of BFD packets lost consecutively when it is declared that failure occurs on the link is determined according to the BFD session negotiation result, and this parameter is defined in the BFD control packet format via a Detect Mult field.

In BFD draft, no protocol for bearing BFD packets is specified; instead, it only proposes to encapsulate a BFD packet by using User Datagram Protocol (UDP), and the BFD packet is identified by employing a UDP destination port number 3784. The format of a BFD packet encapsulated in UDP is as shown in Table 1:

TABLE 1

| 0 1 2 3 4 5 6 7 | 8 9 0 1 2 3 4 5 | 6 7 8 9 0 1 | 2 3 4 5 6 7 8 9 0 1 |
|---|---|---|---|
| Vers  Diag | Sta  P F C A D R | Detect Mult | Length |
| Discriminator generated by the sending system (My Discriminator) ||||
| Discriminator received from the corresponding remote system (Your Discriminator) ||||
| Minimum BFD control packet sending interval desired by the local system (Desired Min TX Interval) ||||
| Minimum BFD receiving interval supported by the system (Required Min RX Interval) ||||
| Minimum interval of received BFD echo packet supported by the system (Required Min Echo RX Interval) ||||
| The following authentication data is optional ||||
| Authentication Type (AuthType) | Authentication Length (AuthLen) || Authentication Data (AuthenticationData) |

The meaning of each field of the BFD packet in Table 1 is shown in Table 2:

TABLE 2

| Domain Name | Meaning |
|---|---|
| Version (Vers) | BFD Protocol Version Number, the current version number is 1 |
| Diagnostic (Diag) | Diagnostic Code describes the causes the local system turns to other states from Up state last time. The meaning is as follows:<br>0 represents No Diagnostic<br>1 represents Control Detection Time Expired<br>2 represents Echo Function Failed<br>3 represents Neighbor Signaled Session Down<br>4 represents Forwarding Plane Reset<br>5 represents PathDown<br>6 represents Concatenated Path Down<br>7 represents Administratively Down<br>8-31 represents Reserved for future use |
| state (Sta) | "State" represents the current BFD session state as seen by the transmitting system.<br>Values are:<br>0 represents Administrator set session DOWN(AdminDown)<br>1 represents BFD session state is DOWN (Down)<br>2 represents an initial state (Init)<br>3 represents BFD session state is UP (UP) |
| Poll (P) | If set as 1, it indicates that connectivity needs to be verified or parameter variation required; if it is set as 0, no verification is needed. |
| Final (F) | 1: For a BFD packet received, if Poll is set, respond to Poll;<br>0: Not respond to Poll. |
| Control Plane Independent (C) | 1: BFD only runs on the data plane, and it is not influenced even if the control plane collapses;<br>0: BFD application shares the state of the control plane (In other words, it collapses when the control plane collapses). |
| Authentication Present (A) | 1: Session needs to be authenticated. |
| Demand (D) | When set as 1, it indicates that the system expects to operate in demand mode; otherwise, the system does not expect to or cannot operate in the above mode |
| Reserved (R) | They must be all zero, and the receiving party ignores these bits. |
| Detect Mult | Detect time multiplier: when transmission interval is negotiated, it needs to be multiplied by this value. This value is used in asynchronous mode. In asynchronous mode, Detect_Mult requires the detection period of the opposite party; in Demand mode, Detect_Mult notifies the opposite party of its own detection period. |
| Length | Length of a BFD control packet in units of byte. |
| My Discriminator | It is a unique nonzero discriminator between two systems generated by the sending system, and used for the demultiplexing (identification) of multiple BFD connects. |
| Your Discriminator | Discriminator (value) is received from the corresponding remote system, and this field is sent back from the received My Discriminator. They are filled as all zero if the situation of the opposite side is unknown. |
| Desired Min TX Interval | Minimum BFD control packet sending interval desired by the local system, in units of microsecond. |
| Required Min RX Interval | Minimum BFD sending interval supported by the system, in units of microsecond. |
| Required Min Echo RX Interval | Minimum interval of received BFD echo packet supported by the system, in units of microsecond. If it is set as 0, the transmitting system does not support BFD echo packet. |
| Auth Type | If A is set, the field represents the authentication type. The meaning is as following:<br>0 represents Reserved (Reserved)<br>1 represents Simple Password Authentication (Simple Password) |

TABLE 2-continued

| Domain Name | Meaning |
| --- | --- |
| | 2 represents Keyed MD5 Authentication (Keyed MD5)<br>3 represents Meticulous Keyed MD5 Authentication (Meticulous Keyed MD5)<br>4-255 represents Reserved for future use |
| Auth Len | Length of the authentication part in units of byte, including Auth Type and Auth Len |

In asynchronous mode, because BFD needs to send and detect a BFD packet rapidly, the sending and detecting of the BFD packet are both performed via logically simple hardware, which is usually configured on a forwarding plane. The establishment and negotiation process of a complex BFD session should be accomplished by software or universal hardware with more complex logic, etc.

In this disclosure, an establishment and negotiation module of a BFD session is abbreviated as a negotiation module, and a sending and detection module of a BFD packet is abbreviated as a detection module.

In the prior art, a method for performing failure detection on a BFD session is as follows:

After a BFD session is established and various BFD session parameters are negotiated, the various BFD session parameters negotiated, such as sending interval and detection interval, are notified to a detection module. Upon receiving the parameter information, the detection module starts a sending timer immediately and periodically sends BFD packets to the opposite side, and at the same time, a timer for detection timing is started immediately and the arrival status of the BFD packet from the opposite party is detected. According to the parameter information negotiated, if it detects that a predetermined number of BFD packets from the opposite party are lost consecutively, it declares that failure occurs on the link. FIG. 2 is a schematic diagram showing a failure detection timing sequence of a BFD session in the prior art. As shown in FIG. 2, provided that, according to the negotiated result of the parameter negotiation stage, router A sends a BFD packet in a time interval of 10 ms as shown by the bidirectional dash-and-dot line in FIG. 2, and router B sends a BFD packet in a time interval of 15 ms as shown by the bidirectional dashed line in FIG. 2. If router A detects that 3 BFD packets sent from router B are lost consecutively, i.e. when lost count is 3, router A declares that failure occurs on the link and sends a state information of the link detected as information DOWN to the application layer.

The above method for detecting the transmitting of a BFD packet has the following disadvantages: in practical applications, the negotiation module needs to spend a time period in notifying the detection module of the parameter negotiation result, the length of the time period is usually influenced by many factors. One of the factors is the busyness state of the negotiation module. Because the negotiation module usually bears tasks of many other BFD sessions, such as establishing, negotiating and routing, the negotiation module is usually very busy. Another factor is the congestion state of the channel between the negotiation module and the detection module. Therefore, the delay needed by the negotiation module to deliver the BFD parameter to the detection module is unpredictable. Sometimes it may be very long, and sometimes it may be very short. Especially when a performance difference or load difference exists between the neighbors of a BFD session, the delay difference is more apparent. When the delay reaches a value, it is inevitable that one side of the BFD session misinforms that a failure occurs on the link.

FIG. 3 is a schematic diagram showing that one side of a BFD session misinforms that a failure occurs on the link. As shown in FIG. 3, in the detection process, router A sends a BFD packet in a time interval of 10 ms as shown by the bidirectional dash-and-dot line in FIG. 3 according to the BFD session negotiation result of the negotiation stage, and router B sends a BFD packet in a time interval of 15 ms as shown by the bidirectional dashed line in FIG. 3. However, due to various causes, router B cannot deliver the BFD session parameter to the detection module in a long time. After router A detects that 3 BFD packets sent from router B are lost consecutively, in other words, when lost count is 3, router A declares that failure occurs on the link and sends the state information of a link detected as information DOWN to the application layer. In FIG. 3, the time when the negotiation stage of the two parties ends is T0, the time consumption for delivering the BFD session parameter to the detection module by the negotiation module of router A is Ta as shown by the heavy bidirectional dashed line, and the time consumption for delivering the BFD session parameter to the detection module by the negotiation module of router B is Tb as shown by the bidirectional double dash-and-dot line.

It can be seen from FIG. 3 that, if Tb is larger than the sum of Ta and the 45 ms detection time of router A, router A misinforms that a failure occurs on the link. Here, because it is detected that 3 BFD packets are lost consecutively and the sending time of each BFD packet is 15 ms, the detection time is 45 ms.

In view of the current method for failure detection on bidirectional forwarding, after various BFD session parameters are negotiated and a BFD session is established, the two parties of the BFD session are triggered into a failure detection stage. Because a difference exists between delays needed by the negotiation modules in routers of the two parties of the BFD session to deliver BFD session parameters to the detection module, the router may misinform that failure occurs on the link during failure detection.

SUMMARY OF THE INVENTION

Therefore, it is an object of the present invention to provide a method for triggering failure detection in BFD, thereby solving the problem that a system for BFD session detection misinforms of link failure.

To achieve the above object, the invention provides the following technical solutions.

A method for triggering failure detection in BFD, in which a BFD session is established between two ends of a bidirectional forwarding link, further includes:

sending, by one side of the BFD session, a BFD packet to the opposite side, and receiving a BFD packet from the opposite side; and triggering, by one side of the BFD session, failure detection when receiving a first BFD packet from the opposite side.

During the establishment of the BFD session, the two sides of the BFD session negotiate to determine BFD session parameters including the timing length of a BFD session detection timer, and set the initial value of a preset label indicating whether a first packet from the opposite side has been received to indicate that a first BFD packet sent by the opposite side of the BFD session has not been received.

If one side of the BFD session receives a first BFD packet from the opposite side, the method further includes: setting the value of the label indicating whether a first packet from the opposite side has been received to indicate that the first BFD packet sent by the opposite side of the BFD session has been received.

The method specifically includes:

A) sending, by one side of the BFD session, a BFD packet to the opposite side periodically according to the time length of the BFD packet sending timer in the BFD session parameter;

B) determining, by one side of the BFD session, whether the value of the label indicating whether a first packet from the opposite side has been received indicates that a first BFD packet sent by the opposite side of the BFD session has not been received, if yes, return to process A; otherwise, the value of the label indicating whether a first packet from the opposite side has been received indicates that a first BFD packet sent by the opposite side of the BFD session has been received, process C is executed; and C) triggering failure detection according to the starting BFD session detection timer preset by the timing length of the BFD session detection timer, and sending, by one side of the BFD session, a BFD packet to the opposite side periodically according to the time length of the BFD packet sending timer.

After process A and prior to process B, the method further includes: setting a timeout timing length, and setting the timing length of the BFD session detection timer as the timeout timing length and starting the BFD session detection timer;

When it is determined in process B that the value of the label indicating whether a first packet from the opposite side has been received is FALSE, it is further determined whether the BFD session detection timer expires, and if yes, one side of the BFD session reports that failure occurs on a forwarding engine of the opposite side, and the procedure ends; if not, the procedure returns to process A.

After process A and prior to process B, the method further includes: setting a timeout timing length and a timeout timer, and setting the timing length of the timeout timer as the timeout timing length and starting the timeout timer;

When it is determined in process B that the value of the label indicating whether a first packet from the opposite side has been received is FALSE, it is further determined whether the timeout timer expires, if yes, one side of the BFD session reports that failure occurs on a forwarding engine of the opposite side, and the procedure ends; if not, the procedure returns to process A.

The session mode of the two sides of the BFD session is asynchronous.

The two sides of the BFD session are systems for implementing BFD functions.

It can be seen from the above technical solutions that, in the present invention, failure detection is started only after one side of a BFD session receives a first BFD packet sent from the opposite side. It can be avoided that a router misinforms a link failure due to the difference between delays needed by negotiation modules in routers of two parties of a BFD session to deliver BFD session parameters to detection modules. The invention further includes detecting whether a failure occurs on a forwarding engine of one side of a BFD session to avoid that one side of a BFD session initiates a malicious attack to make the attacked side misinform link failure.

DETAILED DESCRIPTION OF THE EMBODIMENTS

The core concept of the invention lies in that, after two parties of a bidirectional forwarding link establish a BFD session, one side of the BFD session sends a BFD packet to the opposite side and receives a BFD packet from the opposite side; and when one side of the BFD session receives a first BFD packet from the opposite side, it triggers failure detection.

To make the objects, technical solutions and advantages of the invention more apparent, the invention is now further illustrated in detail in conjunction with the drawings and preferred embodiments.

Figure 1:
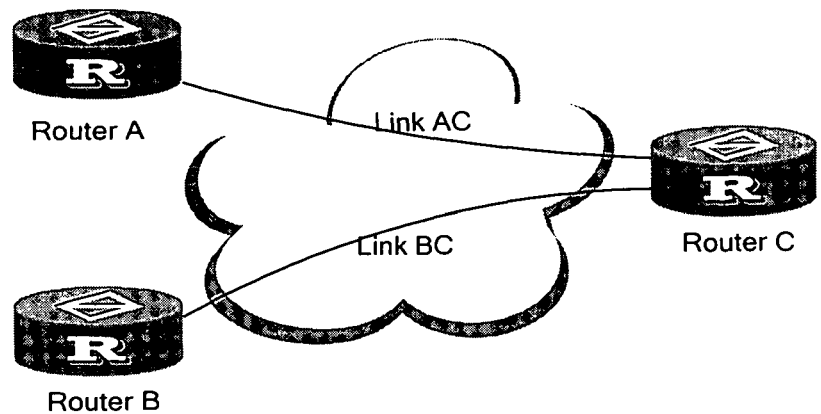
FIG. 1 is a schematic diagram showing networking of an overall application environment of BFD.
Figure 2:
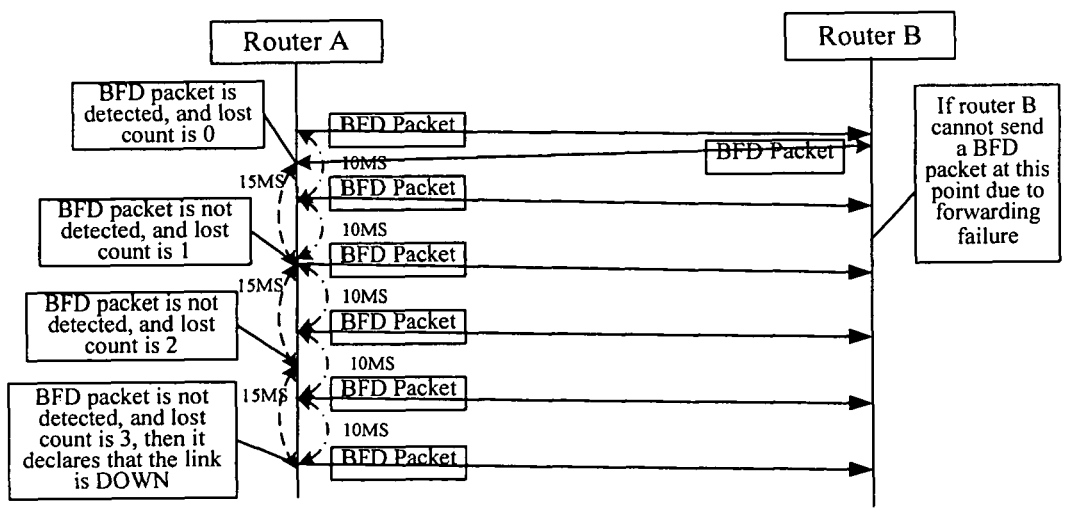
FIG. 2 is a schematic diagram showing the failure detection sequence of a BFD session of the prior art.
Figure 3:
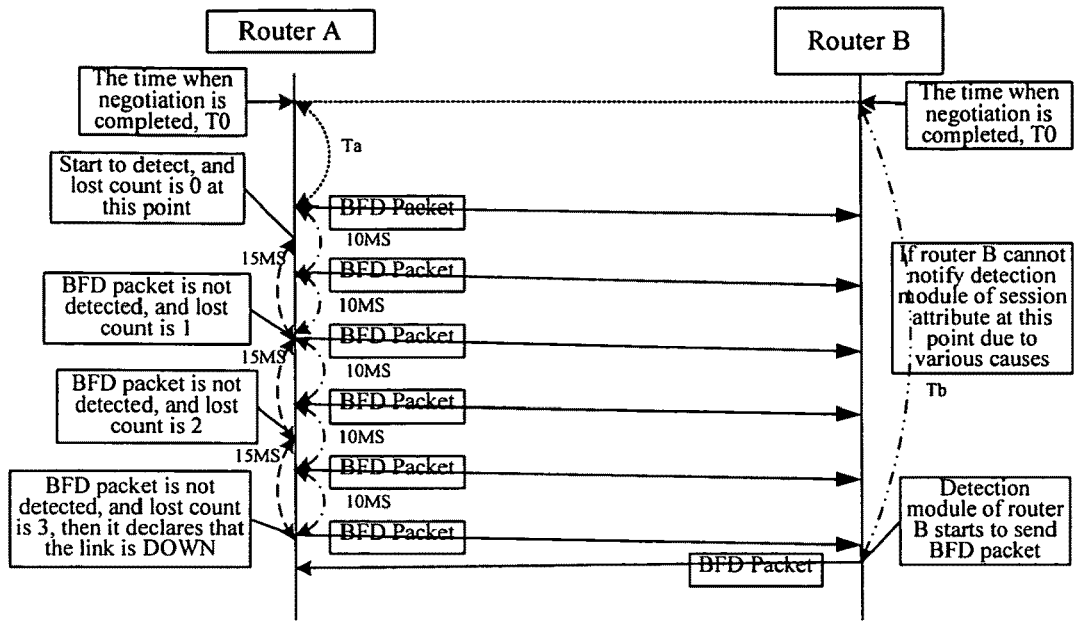
FIG. 3 is a schematic diagram showing that one side of the BFD session misinforms that failure occurs on a link.
Figure 4:
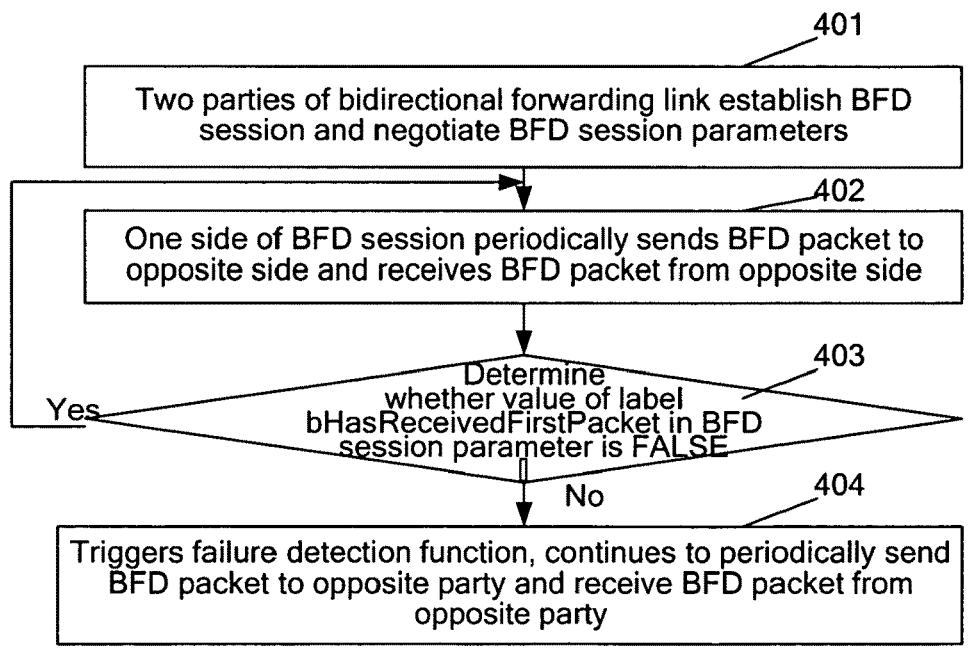
FIG. 4 is a flow chart of the method of triggering failure detection according to the invention.

FIG. 4 is a flow chart of the method for triggering failure detection according to the invention. Taking as an example that the system for implementing BFD session detection is a router, as shown in FIG. 4, the method includes the following processes:

Process 401: The two parties of a bidirectional forwarding link establish a BFD session and negotiate BFD session parameters.

After the negotiation modules of the routers on the two sides of the BFD session negotiate BFD session parameters, the negotiation modules of the routers on the two sides delivers the BFD session parameters respectively to the detection modules of the routers on the two sides, so that a BFD session is established. The BFD session parameters delivered includes BFD session detection period and BFD packet sending period, etc.

Upon receiving the BFD session parameters delivered by a negotiation module, a detection module performs various initialization operations immediately including: setting the time length of a BFD packet sending timer, constructing a BFD packet and setting the time length of a BFD session detection timer. In addition, the invention further includes: setting the initial value of label (bHasReceivedFirstPacket) indicating whether a first packet from the opposite side has been received as FALSE, which indicates that a first BFD packet sent by the opposite side of the BFD session has not been received.

Process 402: One side of the BFD session periodically sends a BFD packet to the opposite side and receives a BFD packet from the opposite side.

After performing various initialization operations, the detection module of the BFD session periodically sends a BFD packet to the opposite side of the BFD session immediately according to the preset time length of the BFD packet sending timer. But, at this point, BFD session detection function is not started.

Process 403: Determine whether the value of the label bHasReceivedFirstPacket in the BFD session parameter is FALSE, if yes, return to process 402; otherwise, execute process 404.

If the detection module of the BFD session receives a first BFD packet sent from the opposite side of the BFD session, it sets the value of the label bHasReceivedFirstPacket as TRUE immediately, which indicates that a first BFD packet sent by the opposite side of the BFD session has been received, and the detection module of the BFD session triggers BFD session detection function and continues to periodically send BFD packets to the opposite side.

Process 404: Failure detection function is triggered and BFD packets are periodically sent to the opposite party.

When the value of label bHasReceivedFirstPacket is TRUE, the detection module of the BFD session triggers failure detection function, i.e. starts a BFD session detection timer according to the time length of a BFD session detection timer that is set, and periodically detects whether a BFD packet sent by the opposite side is received. If the number of BFD packets sent by the opposite side that are lost consecutively reaches a predetermined value, it sends the state information of the detected link as information DOWN to the application layer, thereby reporting that failure occurs on the link of the BFD session. It should be noted that, the method of the invention emphasizes that the moment for triggering failure detection is when the first BFD packet from the opposite side is received, while the method for failure detection is consistent with the existing method.

Figure 5:
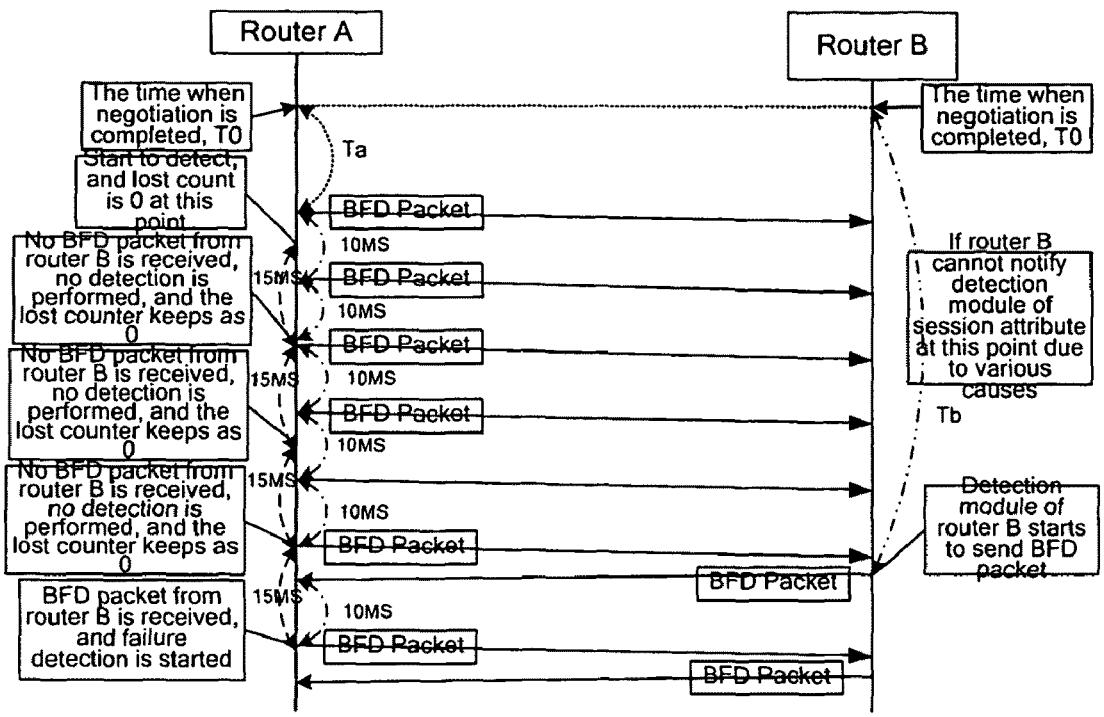
FIG. 5 is a schematic diagram of one embodiment of the invention.

FIG. 5 is a schematic diagram of an embodiment of the invention. As shown in FIG. 5, it is assumed that router A and router B complete the negotiation of BFD session parameters simultaneously at T0. The time consumption needed by the negotiation module of router A to deliver the BFD session parameters to the detection module is Ta as shown by the heavy bidirectional dashed line. After the initialization operation, the detection module sets the value of label bHasReceivedFirstPacket as FALSE. Router A starts to send a BFD packet to router B at time TA. Because the value of label bHasReceivedFirstPacket is FALSE at this point, even if router A does not receive a BFD packet sent from router B, it does not tally up the lost counter due to not receiving a BFD packet from router B. Even if the detection time expires, it does not report that failure occurs on the link; instead, it still sends BFD packets to router B periodically.

The time consumption of the negotiation module of router B for delivering the BFD session parameters to the detection module is Tb as shown by the bidirectional double dash-and-dot line. At time Tb, router A receives the first BFD packet sent by router B and sets the label bHasReceivedFirstPacket as TRUE indicating to start failure detection function, and sets the timing length of the BFD session detection timer as the value determined during BFD negotiation, for example, 45 ms (the time during which three BFD packets are lost consecutively). Then, during the subsequent detection process, if router A does not receive a BFD packet from router B after the BFD session detection timer expires, the lost counter is increased by 1; when the counter reaches a value predetermined during BFD negotiation, router A reports that failure occurs on the BFD link.

It can be seen from this embodiment that, even if the difference between delays needed by neighbors of a BFD session to deliver BFD session parameters is very large, it does not cause one side of the BFD session to misinform that a failure occurs on the link.

Moreover, when the detection module of the BFD session initializes the BFD session detection timer, it firstly sets the timing length of the BFD session detection timer as a value that is large enough, rather than the value determined during negotiation, or it sets the timing length of another timeout timer as a value that is large enough. This value may ensure that the negotiation module can deliver the BFD session parameters to the detection module in this time interval at the worst; or, this value is the maximum value within a tolerable range. In other words, if the negotiation module of the opposite side does not deliver BFD session parameters to the detection module in this time interval, it is regarded that failure occurs on the forwarding engine of the opposite side.

At this point, the method for triggering failure detection function is as follows: after a BFD session is established, the above BFD session detection timer or a timeout timer the timing length of which is set as a value large enough is started; if a first BFD packet sent from the opposite side is not received when the timing length of the BFD session detection timer/timeout timer expires, it is reported that failure occurs on the forwarding engine of the opposite side; if the first BFD packet sent from the opposite side is received before the timing length of the BFD session detection timer/timeout timer expires, the timing length of the BFD session detection timer is set as the value determined during BFD negotiation, or the timeout timer is stopped and a BFD session detection timer is started according to the timing length of the BFD session detection timer determined during BFD negotiation, and the BFD session is continued, so that failure detection is triggered.

Thus, if a failure occurs on one side of a BFD session or the link of the BFD session immediately after the BFD session is established, the detection module on the other side of the BFD session does not permanently wait for the first BFD packet sent from the opposite side.

In addition, attacks initiated by a malicious opposite side are prevented. For example, when the malicious opposite side does not send a BFD packet to the attacked side and dismantles the local BFD session without notifying the attacked side after BFD session negotiation is completed, the attacked side is not in permanent waiting state.

The above illustrated are only preferred embodiments of the invention, and are not for use in limiting the invention. Accordingly, various modifications and variations may be made without departing from the spirit or scope of the invention as defined by the appended claims and their equivalents.

The invention claimed is:

1. A method for triggering failure detection in Bidirectional Forwarding Detection, wherein a Bidirectional Forwarding Detection session is established between two sides of a bidirectional forwarding link, and the method comprises:

during the establishment of the Bidirectional Forwarding Detection session, negotiating by the two sides of the Bidirectional Forwarding Detection session to determine Bidirectional Forwarding Detection session parameters including a timing length of a Bidirectional Forwarding Detection session detection timer, and setting an initial value of a preset label indicating whether a first packet from an opposite side has been received to indicate that a first Bidirectional Forwarding Detection packet sent by the opposite side of the Bidirectional Forwarding Detection session has not been received;

when receiving the first Bidirectional Forwarding Detection packet from the opposite side, setting a value of the label indicating whether a first packet from the opposite side has been received to indicate that the first Bidirectional Forwarding Detection packet sent by the opposite side of the Bidirectional Forwarding Detection session has been received;

A) sending, by one side of the Bidirectional Forwarding Detection session, a Bidirectional Forwarding Detection packet to the opposite side periodically according to a time length of a Bidirectional Forwarding Detection packet sending timer in the Bidirectional Forwarding Detection session parameters;

B) determining, by one side of the Bidirectional Forwarding Detection session, whether the value of the label indicating whether a first packet from the opposite side has been received indicates that the first Bidirectional Forwarding Detection packet sent by the opposite side of the Bidirectional Forwarding Detection session has not been received, if the value of the label indicating whether the first packet from the opposite side has been received indicates that the first Bidirectional Forwarding Detection packet sent by the opposite side of the Bidirectional Forwarding Detection session has not been received, the procedure return to process A; otherwise, the value of the label indicating whether a first packet from the opposite side has been received indicates that the first Bidirectional Forwarding Detection packet sent by the opposite side of the Bidirectional Forwarding Detection session has been received, process C is executed; and C) triggering failure detection according to a starting Bidirectional Forwarding Detection session detection timer preset by the timing length of the Bidirectional Forwarding Detection session detection timer, and sending, by one side of the Bidirectional Forwarding Detection session, the Bidirectional Forwarding Detection packet to the opposite side periodically according to the time length of a Bidirectional Forwarding Detection packet sending timer.

2. The method according to claim 1, wherein, after process A and prior to process B, the method further comprises: setting a timeout timing length, and setting the timing length of the Bidirectional Forwarding Detection session detection timer as the timeout timing length and starting the Bidirectional Forwarding Detection session detection timer; and when it is determined in process B that the value of the label indicating whether a first packet from the opposite side has been received is FALSE, it is further determined whether the Bidirectional Forwarding Detection session detection timer expires, if the Bidirectional Forwarding Detection session detection timer expires, one side of the Bidirectional Forwarding Detection session reports that failure occurs on a forwarding engine of the opposite side, and the procedure ends; if not, the procedure returns to process A.

3. The method according to claim 2, wherein, the session mode of the two sides of the Bidirectional Forwarding Detection session is asynchronous mode.

4. The method according to claim 1, wherein, after process A and prior to process B, the method further comprises: setting a timeout timing length and a timeout timer, and setting the timing length of the timeout timer as the timeout timing length and starting the timeout timer; and when it is determined in process B that the value of the label indicating whether a first packet from the opposite side has been received is FALSE, it is further determined whether the timeout timer expires, if the timeout timer expires, one side of the Bidirectional Forwarding Detection session reports that failure occurs on a forwarding engine of the opposite side, and the procedure ends; if not, the procedure returns to process A.

5. The method according to claim 4, wherein, the session mode of the two sides of the Bidirectional Forwarding Detection session is asynchronous mode.

6. The method according to claim 1, wherein, the session mode of the two sides of the Bidirectional Forwarding Detection session is asynchronous mode.

7. The method according to claim 6, wherein, the two sides of the Bidirectional Forwarding Detection session are systems for implementing Bidirectional Forwarding Detection functions.

8. The method according to claim 7, wherein, the two sides of the Bidirectional Forwarding Detection session are systems for implementing Bidirectional Forwarding Detection functions.

9. The method according to claim 1, wherein, the session mode of the two sides of the Bidirectional Forwarding Detection session is asynchronous mode.

10. The method according to claim 6, wherein, the two sides of the Bidirectional Forwarding Detection session are systems for implementing Bidirectional Forwarding Detection functions.

11. The method according to claim 9, wherein, the two sides of the Bidirectional Forwarding Detection session are systems for implementing Bidirectional Forwarding Detection functions.

12. The method according to claim 1, wherein, the session mode of the two sides of the Bidirectional Forwarding Detection session is asynchronous mode.

13. The method according to claim 12, wherein, the two sides of the Bidirectional Forwarding Detection session are systems for implementing Bidirectional Forwarding Detection functions.

14. The method according to claim 1, wherein, the session mode of the two sides of the Bidirectional Forwarding Detection session is asynchronous mode.

15. The method according to claim 14, wherein, the two sides of the Bidirectional Forwarding Detection session are systems for implementing Bidirectional Forwarding Detection functions.

* * * * *